J. G. WIDMANN.

Stoves.

No. 5,605. Reissued Oct. 14, 1873.

Witnesses,
R. T. Campbell.
J. N. Campbell.

Inventor
John George Widmann
by his Atty
Mason Fenwick & Lawrence

N. PETERS, PHOTO-LITHOGRAPHER, WASHINGTON, D. C.

UNITED STATES PATENT OFFICE.

JOHN G. WIDMANN, OF YONKERS, NEW YORK.

IMPROVEMENT IN STOVES.

Specification forming part of Letters Patent No. 23,970, dated May 10, 1859; extended seven years; reissue No. 5,605, dated October 14, 1873; application filed July 16, 1873.

*To all whom it may concern:*

Be it known that I, JOHN G. WIDMANN, of Yonkers, in the county of Westchester and State of New York, have invented certain Improvements on Base-Burning Stoves or Heaters; and I do hereby declare that the following is a full, clear, and exact description thereof, reference being had to the accompanying drawings, in which—

Figure 1:
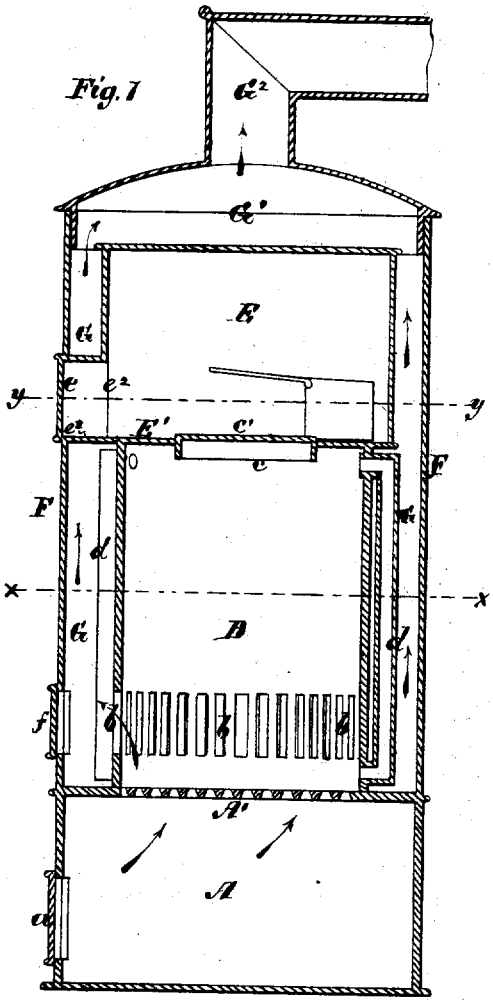
Figure 2:
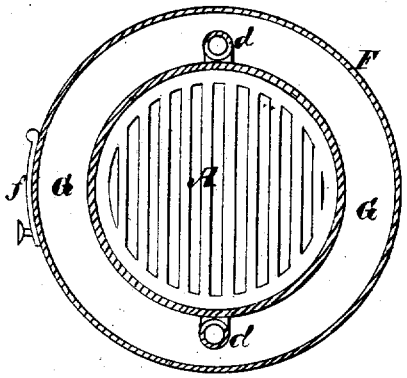
Figure 3:
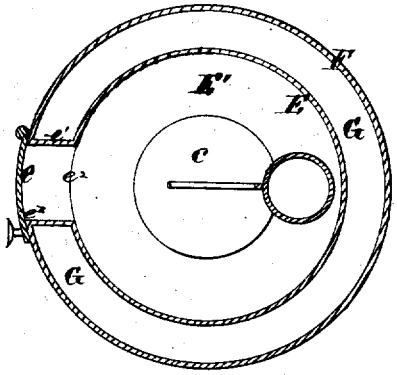

Figure 1 is a section taken vertically through the improved stove from front to rear. Fig. 2 is a section through the stove in the horizontal plane indicated by dotted lines *x x*, Fig. 1. Fig. 3 is a section through the stove, as indicated by dotted line *y y*.

Similar letters of reference indicate corresponding parts in the several figures.

My invention relates to certain novel improvements on that class of stoves or heaters which are provided with fuel reservoirs or magazines, and are denominated base-burners. My object is, first, to arrange above a fuel-magazine a chamber which is so exposed to heat that it serves the purpose of an oven in which to cook or bake, as will be hereinafter explained; second, to provide for conducting any gas which may rise in the magazine above the fuel therein down into the bed of incandescent coals, thus consuming this gas, as will be hereinafter explained.

The following description of my improvements, applied to a base-burning stove of a well-known construction, will enable others skilled in the art to understand the same.

For the purpose of making a base-burning heater capable of use for cooking purposes, I construct over the magazine D *b*, or over the magazine of any other well-known base-burning stove, and within the casing F thereof, an oven, E, with a bottom which is of greater diameter than the magazine, but of smaller diameter than the outer wall A F, so that its sides, as well as a portion, *s*, of its bottom, extend into the circulation-space beyond the magazine. In the bottom of this oven I form a feed or fuel-supply passage, *c*, and close the same with a tightly-fitting cover, *c'*. In one side of the oven I form a door or passage, $e^2$, large enough for the introduction and withdrawal of cooking-utensils; and around this passage a collar, $e^1$, is formed, and by means of said collar the oven is connected to the outer casing of the stove or heater. Directly opposite the opening formed in the oven a corresponding opening is formed in the outer casing, and the said opening is closed by a door, *e*. The collar isolates the interior of the oven from the circulation-space G $G^1$ and draft-flue $G^2$, but permits, through the door $e^1$, access to the interior of the oven. The oven does not extend up to the top of the outer wall of the stove, but terminates below the same, so that a free circulation-space, $G^1$, shall be between its top and the top of the said outer wall. By this construction a portion of the bottom of the oven is exposed to the direct contact of the products of combustion, while its sides and top are fully exposed thereto, excepting that portion thereof which is inclosed by the collar $e^1$. This collar, however, is exposed to the effect of the products of combustion, and aids in heating or cooking anything which may be within the oven. That portion of the bottom of the oven which is directly over the magazine is exposed to the heat generated in said magazine; and for the purpose of preventing an accumulation of gas in the magazine above the fuel, I provide pipes *d*, which lead out of the magazine near its upper end, and extend down to that portion of the mass of coals which is in an incandescent state. These pipes convey the pent-up gases down to and amid the burning coal, where they are consumed.

It will be seen from the above description that I arrange over a base-burning fuel-magazine a cooking or baking oven, E, all sides of which are exposed to the effects of the heat of the products of combustion which rise through circulation-chambers G $G^1$, and the bottom to the direct action of the heat in the magazine. It will also be seen that the oven is completely inclosed in the upper end of the outer wall or casing F of the stove, and being thus hidden from view the stove answers admirably as a heating and cooking stove combined; also, that the gas-pipes *d d* will conduct any gas which rises in the magazine D above the reserve fuel out of the same, and down and into the burning fuel, thereby preventing the gas from entering the said oven E, or from puffing or exploding when the cover *c'* is removed. It will be further seen that the oven E, which I have constructed for baking purposes, in connection with a heating-stove, has no opening through it for the passage of the products of combustion to the draft-flue, and hence, in connection with its arrangement for the application of heat to all its exterior parts, it is very completely adapted for baking-purposes.

The stove represented has an illumination-door, *f*, in its outer wall opposite the grated spaces *b b* of the magazine, for the purpose of exposing the light of the fire, and showing its condition; and the ash-pit A has a door, *a*, through which the ashes may be removed.

My invention, however, is not to be confined to any such particular details of construction, as it is applicable to a great variety of base-burning stoves without changing its principle of operation.

Having thus described my invention, what I claim as new, and desire to secure by Letters Patent, is—

1. An oven for cooking purposes placed over or above a fuel-magazine of a base-burning stove, substantially as described.

2. An oven, E, placed over or above the fire, in combination with a base-burning fuel-magazine, casing F, flue-space G, and door *e*, substantially as described.

3. The chamber $G^1$ above the oven E, in combination with a flue-space, G, leading from the fire-chamber of a base-burning fuel-magazine, substantially as described.

4. The oven-bottom in a base-burning magazine-stove partly exposed to the direct action of the fire, substantially as described.

5. The combination of the oven-door *e*, the opening *c* through the oven-bottom E′, the removable cover *c′*, and the base-burning fuel-magazine, substantially as described.

6. Tubes or conduits leading from near the top of the magazine D, and extending down to the incandescent coals near its base, for the purpose of conducting the gases from above the fuel in the magazine and delivering them to the incandescent coal, substantially as described.

JOHN GEORGE WIDMANN.

Witnesses:
R. SCHMIDT,
RUDOLF EICKEMEYER.